United States Patent
Gaddess et al.

(10) Patent No.: US 6,385,668 B1
(45) Date of Patent: May 7, 2002

(54) METHOD AND APPARATUS FOR COMPOUND HARDWARE CONFIGURATION CONTROL

(75) Inventors: Terry Gene Gaddess, Wheaton; Mark Wellbrock, Aurora, both of IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/288,763

(22) Filed: Apr. 8, 1999

(51) Int. Cl.[7] .................. G06F 15/177; G06F 3/00; G06F 13/00; G06F 15/16; G06F 15/173

(52) U.S. Cl. .................. 710/8; 710/15; 710/16; 710/104; 713/1; 713/100; 709/220; 709/221; 709/222; 709/223; 709/224; 709/249; 370/254; 379/219

(58) Field of Search .................. 710/8, 15, 16, 710/104, 131; 713/1, 100; 709/208, 209, 220, 221, 222, 223, 224, 249; 370/254, 255; 379/14, 219

(56) References Cited

U.S. PATENT DOCUMENTS

| | | | | |
|---|---|---|---|---|
| 5,664,170 A | * | 9/1997 | Taylor | 709/220 |
| 5,774,689 A | * | 6/1998 | Curtis et al. | 395/500.42 |
| 5,784,557 A | * | 7/1998 | Oprescu | 709/220 |
| 5,802,365 A | * | 9/1998 | Kathail et al. | 709/301 |
| 5,809,329 A | * | 9/1998 | Lichtman et al. | 710/8 |
| 5,884,072 A | * | 3/1999 | Rasmussen | 709/223 |
| 5,935,208 A | * | 8/1999 | Duckwall et al. | 709/221 |
| 5,948,063 A | * | 9/1999 | Cooper et al. | 709/223 |
| 5,991,842 A | * | 11/1999 | Takayama | 710/105 |
| 6,041,364 A | * | 3/2000 | Lortz et al. | 709/301 |
| 6,098,098 A | * | 8/2000 | Sandahl et al. | 709/221 |
| 6,131,119 A | * | 10/2000 | Fukui | 709/224 |
| 6,243,746 B1 | * | 6/2001 | Sondur et al. | 709/220 |
| 6,260,063 B1 | * | 7/2001 | Ludtke et al. | 709/224 |

\* cited by examiner

Primary Examiner—Jeffrey Gaffin
Assistant Examiner—Tanh Q. Nguyen

(57) ABSTRACT

Hardware reconfiguration is accomplished through the use of low-level, self-terminating software processes that allows a high degree of parallelism in the reconfiguration operation, even in systems utilizing a mixture of recently developed hardware and software in combination with legacy components. In a system including a centralized processor resource and a plurality of interconnected hardware elements, a method is provided for performing hardware reconfiguration, the method comprising the steps of receiving a request for reconfiguration of one or more predetermined hardware elements, and, in response thereto, initiating at least one master terminal process to determine family relationships among the predetermined hardware elements and other hardware elements to which the predetermined hardware elements are connected. Based upon these family relationships, terminal slave processes are initiated to accomplish hardware element reconfiguration. Apparatus for performing hardware reconfiguration is also described.

19 Claims, 3 Drawing Sheets

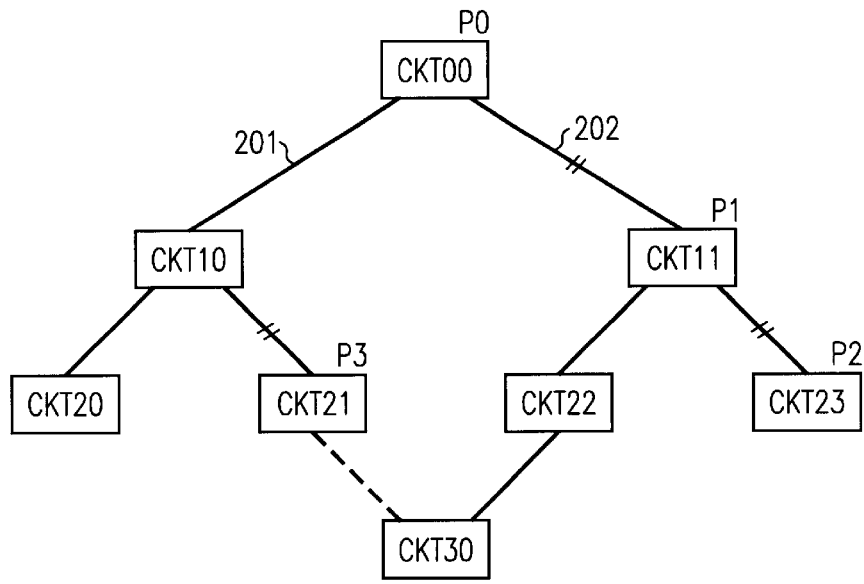
*FIG. 2*
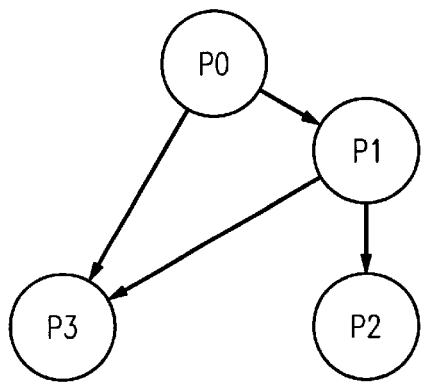
*FIG. 3*
| DEPEND[P0] |  | ✓ | ✓ | ✓ |
| --- | --- | --- | --- | --- |
| DEPEND[P1] |  |  | ✓ | ✓ |
| DEPEND[P2] |  |  |  |  |
| DEPEND[P3] |  |  |  |  |
*FIG. 4*

METHOD AND APPARATUS FOR COMPOUND HARDWARE CONFIGURATION CONTROL

FIELD OF THE INVENTION

This invention relates generally to systems having multiple hardware elements and in particular to computerized systems having a distributed architecture in which system functionality is distributed among a plurality of subordinate hardware elements, and is more particularly directed toward computerized systems in which reconfiguration and maintenance of the subordinate hardware elements is routinely performed.

BACKGROUND OF THE INVENTION

The earliest electronic systems, such as the first digital computers, included only one level of intelligence. The first computers, in other words, included a single central processing module that performed all computer operations. Memory devices and input/output (I/O) devices were generally connected to the central processing module via address, data, and control bus structures that allowed for complete control of these additional computer system elements by the central processing module.

As computer systems evolved, and processor elements became cheaper and more widely available, there was a general trend toward the implementation of intelligent subordinate modules that could perform certain elementary tasks, thus freeing up the central processing resource for primary computation. This distribution of system intelligence began with the development of the intelligent I/O processor, and spread quickly into other areas of computer system design. Once it became possible to include a fairly high level of intelligence within a particular subordinate system element, a degree of independence was achieved that made it unnecessary for a complete address, data, and control bus structure to be extended to every subordinate element. All that was generally required was the establishment of a simple interface that permitted exchange of data, control and status information between the central processor and the subordinate module or peripheral. These interfaces often took the form of serial busses for the sake of hardware economy.

Once the independence of subordinate modules was clearly established, development of new and improved intelligent peripherals became widespread and competitive. Although consequent price reductions and improved performance benefited system purchasers, the central processor was steadily losing control of the peripherals. Although this loss of control was consistent with the pervasive notion of distributed architectures, and did not generally cause problems with system operation, an increasing lack of commonality between the core processor units and the peripheral devices within a system began to cause problems with system configuration and maintenance, since these were functions that the core processor, of necessity, needed to retain.

The distributed architecture continued to invade electronic systems generally, rather than being restricted to computer systems in particular. In telecommunications switching, for example, an electronic switching system can be viewed as a massively distributed system with one or more central processing resources in communication with a plurality of subordinate hardware elements, each with one or more processors of its own. Although such distribution of computing power results in performance enhancements in terms of speed and economy of execution for telecommunications switching applications, it also gives rise to problems of its own.

The subordinate modules that perform telecommunications signal processing are constantly being upgraded to perform more complex operations more quickly. When a telecommunications switch is first placed in service, there are certain family relationships among the central processing modules and the subordinate modules that streamline the maintenance and reconfiguration functions that must often be performed in telecommunications equipment. As the subordinate modules are improved and enhanced, these family relationships are sometimes changed or degraded in the name of progress. Maintenance and configuration operations must still be performed, however, often by legacy software that is at the heart of the system. It is often impossible to replace or upgrade the highest level software often enough to take into account the improved capabilities of newly introduced subordinate modules.

Accordingly, a need arises for a technique that allows legacy software to cope effectively with changing hardware relationships introduced by new hardware elements.

SUMMARY OF THE INVENTION

These needs and others are satisfied by the method and apparatus of the present invention, in which hardware reconfiguration is accomplished through the use of low-level, self-terminating software processes that allows a high degree of parallelism in the reconfiguration operation, even in systems utilizing a mixture of recently developed hardware and software in combination with legacy components.

According to the invention, in a system including a centralized processor resource and a plurality of interconnected hardware elements, a method is provided for performing hardware reconfiguration, the method comprising the steps of receiving a request for reconfiguration of one or more predetermined hardware elements, and, in response thereto, initiating a master terminal process to determine family relationships among the predetermined hardware elements and other hardware elements to which the predetermined hardware elements are connected. Based upon these family relationships, slave terminal processes are initiated to accomplish hardware element reconfiguration. The step of receiving a request may comprise to receiving a request for hardware reconfiguration at a system process of the centralized processor resource via a predetermined messaging protocol. Determining family relationships comprises determining the degree of dependence of subtending hardware elements on the modules to which they subtend.

The step of initiating the master terminal process to determine family relationships further comprises the steps of invoking a master terminal process and supplying at least one parameter identifying hardware elements to be reconfigured, and, at the master terminal process, calling a software primitive to access an associated data base, acquire stored information relating to the hardware elements to be reconfigured, and determine fly relationships among the hardware elements to be reconfigured and other hardware elements to which the hardware elements to be reconfigured are connected.

In accordance with one aspect of the invention, the associated data base includes both static and dynamic information. Static information includes data related to physical characteristics of the hardware elements. These physical characteristics include type of hardware element and points of physical connection to other hardware elements. Dynamic information includes data related to status of hardware elements, particularly operational status. If the hardware element is not operational, hardware status includes information relating to hardware defects.

In one form of the invention, degree of dependence is defined by assigning a relationship to each hardware element selected from the set of relationships consisting of dedicated, delegated, and acquired. A dedicated relationship is a relationship that includes hardware elements subtending to an element originally requested for reconfiguration that must be reconfigured by the master terminal process. A delegated relationship is a relationship that includes hardware elements subtending to an element originally requested for reconfiguration that is reconfigured by a slave terminal process. An acquired relationship is a relationship that includes hardware elements that are not dedicated or delegated, and for which a slave process is willing to assume responsibility. A slave terminal process may be initiated by the master terminal process or by another slave terminal process.

In accordance with another aspect of the invention, the step of initiating slave terminal processes to accomplish hardware element reconfiguration further comprises the steps of determining, based upon family relationships, those hardware elements that must be reconfigured by the master terminal process to form a first set of hardware elements, and initiating a slave terminal process for each hardware element be reconfigured that is not an element of the first set of hardware elements.

For a system including a centralized processor resource and a plurality of interconnected hardware elements, an apparatus is provided for performing hardware reconfiguration comprising means for receiving a request for reconfiguration of one of the predetermined hardware elements, means for initiating, in response to the request, a master terminal process to determine family relationships among the predetermined hardware elements and other hardware elements to which the predetermined hardware elements are connected, and means for initiating, based upon the family relationships, slave terminal processes to accomplish hardware element reconfiguration.

The means for receiving a request for reconfiguration comprises an software process running on the centralized processor resource. The means for initiating the master terminal process to determine family relationships comprises computer executable program code means for accessing an associated data base, acquiring stored information relating to the hardware elements to be reconfigured, and determining family relationships among the hardware elements to be reconfigured and other hardware elements to which the hardware elements to be reconfigured are connected.

In yet another form of the invention, in a telecommunications switch module that includes a centralized processor resource and a plurality of interconnected hardware elements, a method is provided for performing hardware reconfiguration, the method comprising the steps of receiving a request for reconfiguration of one of the predetermined hardware elements at a system process of the centralized processor resource via a predetermined messaging protocol, and, in response thereto, invoking a master terminal process and supplying at least one parameter identifying hardware elements to be reconfigured. The method further includes, at the master terminal process, calling a software primitive to access an associated data base, acquire stored information relating to the hardware elements to be reconfigured, and determine family relationships among the hardware elements to be reconfigured and other hardware elements to which the hardware elements to be reconfigured are connected, to determining, based upon the family relationships, those hardware elements that must be reconfigured by the master terminal process to form a first set of hardware elements, and initiating a slave terminal process for each hardware element to be reconfigured that is not an element of the first set of hardware elements.

Further objects, features, and advantages of the present invention will become apparent from the following description and drawings.

BRIEF DESCRIPTION OF THE DRAWINGS

FIG. 2 illustrates family characteristics of hardware elements in accordance with the present invention;

FIG. 3 indicates process dependencies in accordance with the present invention;

FIG. 4 is a stylized depiction of a dependency matrix in accordance with the present invention.

DETAILED DESCRIPTION OF THE INVENTION

Figure 1:
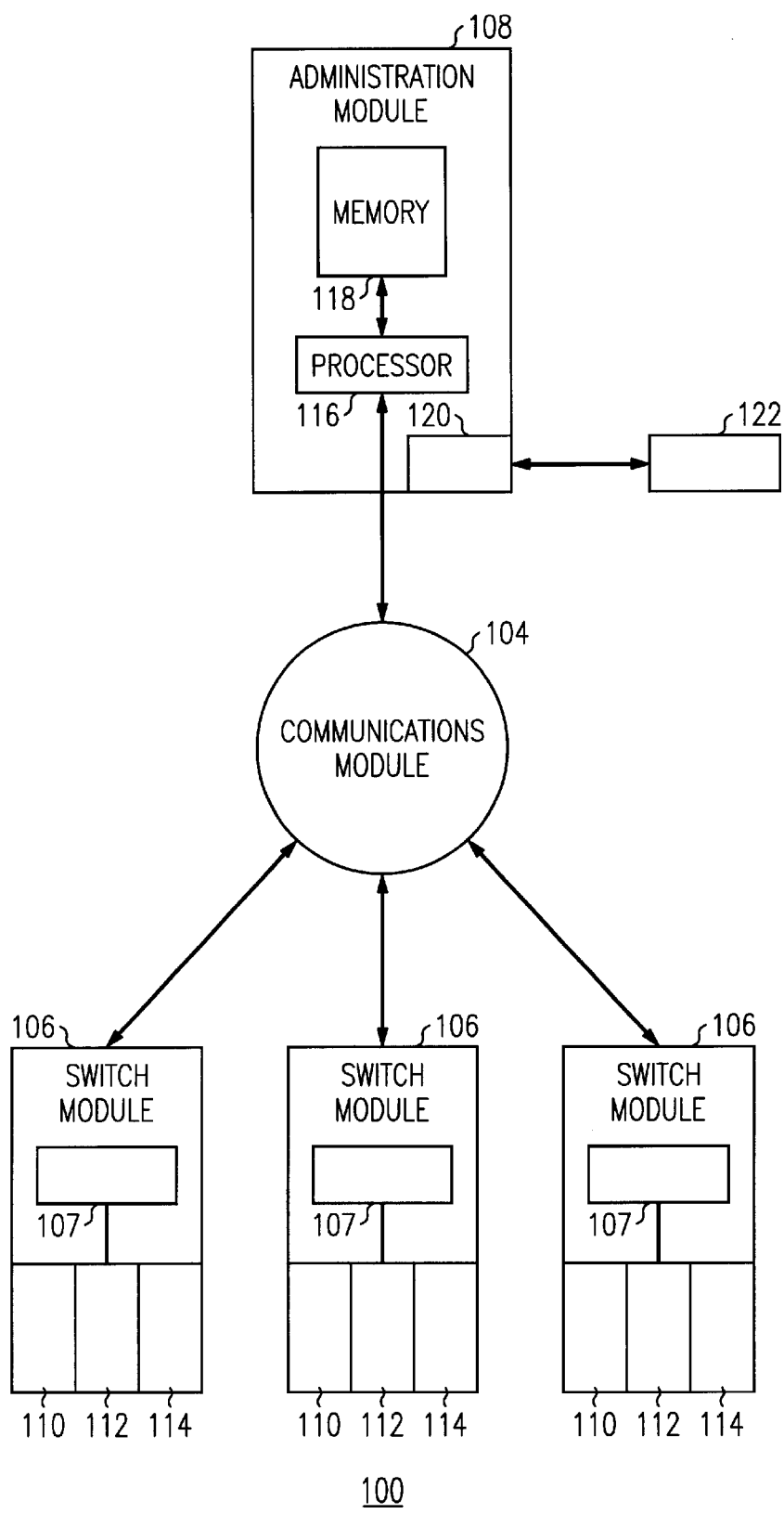
FIG. 1 is a block diagram representation of a telecommunications switching system.
Figure 5:
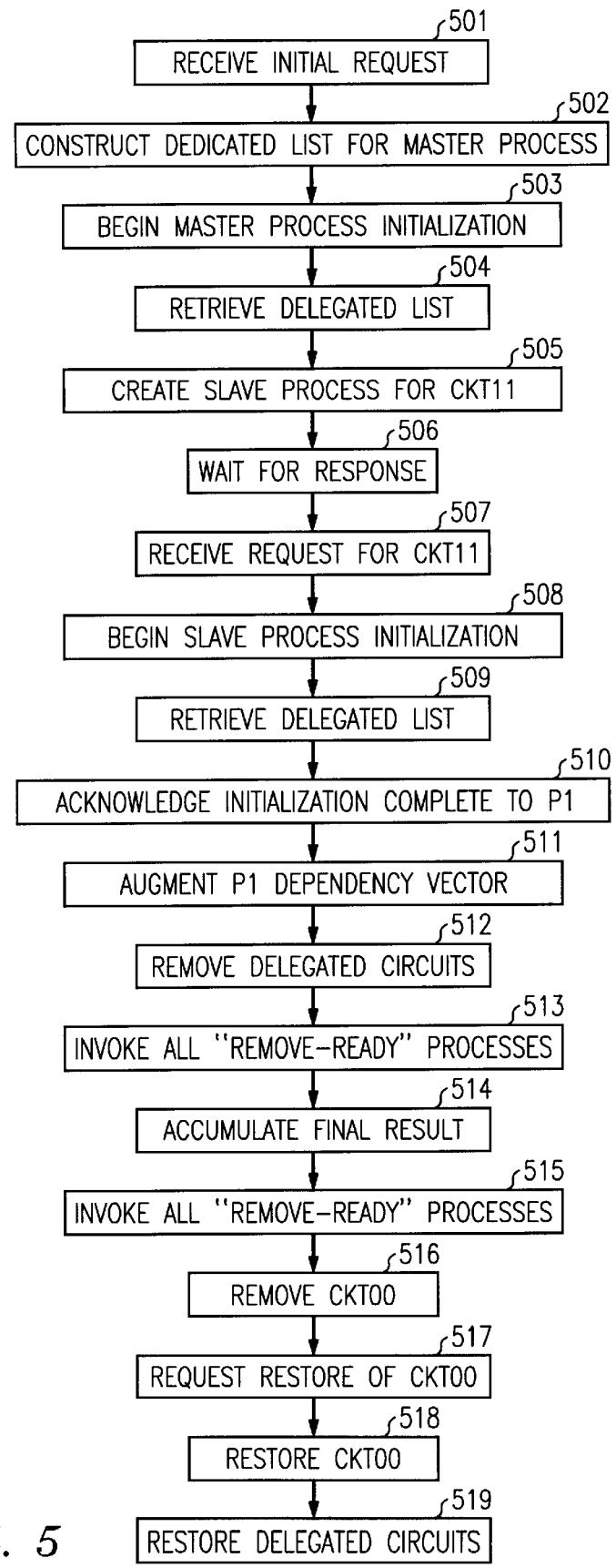
FIG. 5 is a flow chart of an exemplary reconfiguration process in accordance with the present invention.

In accordance with the present invention, a method and apparatus are described for efficiently accomplishing hardware maintenance and reconfiguration that provides distinct advantages when compared to the prior art. The invention can best be understood with reference to the accompanying drawing figures.

The following merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown.

The functions of the various elements shown in the figures, including functional blocks labeled as "processors,"

may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read-only memory (ROM) for storing software, random access memory (RAM), and non-volatile storage. Other hardware, conventional and/or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementer as more specifically understood from the context.

FIG. 1 is a block diagram of a telecommunications switching system 100 such as that described in U.S. Pat. No. 4,592,048 issued to Beckner et al. on May 27, 1986. Such a switching system 100 may be a 5ESS switch, described in "AT&T Technical Journal," Vol. 64, No. 6, part 2, pp. 1305–1564, July/August 1985, and manufactured by Lucent Technologies.

The architecture of such a switching system 100 includes a communication module 104 forming a hub and having a plurality of switch modules 106 and an administration module 108 emanating therefrom. Each switch module 106 is controlled by a microprocessor 107 and provides call processing, time division switching, and signaling for the lines and trunks to which it is connected. Line units to 110 provide interface to customer lines that connect to customer premise equipment, and trunk units 112 provide interface to the trunks that connect the other elements of the network, such as switches. Finally, circuit units 114 provide tones, announcements, recorded messages, tone decoding and the like.

The administration module 108 provides functions that can be centralized, such as maintenance control, technician interface, text and data base management, call routing and time slot allocation. The administration module 108 consists of a control unit such as the Lucent Technologies 3B21D duplex processor 116 and main store memory 118. In some switching systems, the administration module 108 is assisted by a separate processor that performs some administrative functions. The administration module 108 also includes an input/output processor 120 providing communication between the switching system 100 and peripheral devices 122, such as terminals, printers and the like.

Communication module 104 is the hub of the switching system 100 and allows communication between the administration module 108 and the switch modules 106. Communication module 104 consists of a message switch that provides the administration module-to-switch module, and switch module-to-switch module message communication, and a time multiplexed switch providing the switch module-to-switch module time slot connection for voice and data communication, and clock distribution.

As mentioned previously, a typical switch module includes hardware elements that provide interfaces to customer premise equipment, trunk lines that may connect to other switching system elements, and circuit units that provide tones, announcements, and the like. Modem telecommunications switches are also used for data interconnections. Each switch module includes a microprocessor that executes switch module operating system software. Since switch modules are designed for high reliability, there is generally a standby processor as well that is designed to take over operation of the switch module if the primary processor should fail.

The subordinate hardware elements that form a part of the switch module (the subordinate hardware elements are the aforementioned hardware elements that provide line interface, trunk interface, and circuit functions, among others) are also generally microprocessor-controlled, and may contain operating system software of their own. In a telecommunications switching system, software processes running on the primary controlling processor of the switch module are used to configure/reconfigure the subordinate hardware elements, and these software processes use data base records to keep track of the state of the subordinate hardware elements. The subordinate hardware elements within the switch module hardware can be controlled through the administration module. Data base records are also used to record relationships between hardware elements.

Redundancy is also common among line, trunk and circuit units in telecommunications switching systems. In order to ensure fault-free operation, each line unit connected to a switch module may have a back-up unit that is operating in a standby mode, ready to be activated by the switch module if the primary unit were to fail. It is more however, for line and trunk units to include redundant hardware for increased reliability, thus making back-up units unnecessary.

In addition to primary switch modules, the telecommunications switching system may include remote switch modules (RSMs) that connect to a primary switch module through one or more interface units. The architecture of the RSM is similar to that of a switch module. In many respects an RSM is simply a switch module that is installed remotely from the central office that contains the primary switch module.

When there is a distinct dependence of a first hardware element on a second hardware element, the first hardware element is generally denominated a child of the second, and the second hardware element is called the parent of the first. Similarly, when two hardware units can serve as backups for each other, one unit actively functioning in the system and the other waiting in a standby mode to take over active operation when necessary, they are referred to as mates. A typical reconfiguration request may involve removing a particular element from service, diagnosing a particular element, restoring a particular element to in-service, or switching a particular element from active service to standby service.

It should be noted that the switch module processor can be considered a centralized processor resource for a system having a plurality of interconnected hardware elements. However, although a telecommunications switch module is the system described in the exemplary embodiment, the technique described is equally applicable to any complex hardware platform with a central processor resource and interconnected hardware elements.

Since hardware architectures are continually evolving, particularly in real-time switching systems, a more flexible approach to doing reconfigurations becomes desirable. It becomes highly advantageous to reuse existing, but potentially incompatible, reconfiguration software in the context of new family relationships introduced by this hardware architectural evolution. With the use of additional relationship data, multiple software processes may be used to honor reconfiguration requests on a family of hardware elements. With multiple processes, some reconfiguration work can be done concurrently as long as existing rules concerning the order of operations done on parents versus children versus mates are followed.

An arbitrary hierarchy of hardware can be reconfigured by a corresponding hierarchy of processes. The initial process is designated as the master process and the others as slave processes. The master process controls the sequencing and actions of the others through interprocess messaging and a global dependency matrix kept in shared memory. Each process involved in a request has a dependency vector which constitutes a row in the matrix. The dependency matrix consists of all of the vectors for all processes involved in the request.

In addition to the existing hardware family relationships described above, the new hardware relationship sets are defined as follows:

DEDICATED: Dedicated elements are those hardware elements which are subtending to (or underneath, in the family tree structure) the element which was originally requested for reconfigurartion and must be reconfigured by the master process.

DELEGATED: Delegated elements are those hardware elements which are subtending to the element which was originally requested for reconfiguration, but which will be reconfigured in a separate process from the parent hardware element—a delegated process. A delegated process can be either a slave process delegated by the master process or a slave process delegated by another slave process.

ACQUIRED: Acquired elements are those hardware elements for which a delegated process is designed to assume responsibility. This hardware set is used only by a slave process, and allows the optimization of reducing the number of processes required for a request by reconfiguring a group of vertically unrelated elements all in one process.

To reveal the fundamental aspects of the architecture, FIGS. 2 through 5 depict an example in which four processes are used to reconfigure eight hardware elements. The processes are designated as P0 through P3, with P0 being the master process. The hardware elements are depicted as circuits and are designated as CKT00 through CKT30.

The requested circuit, CKT00, and several other subtending circuits are to be removed from service and then restored back to service.

Subtending circuits CKT11, CKT21, and CKT23 are to be DELEGATED to separate processes. CKT30 has multiple parents, CKT21 and CKT22, but will become the responsibility of the process assigned to CKT11, since process will be the first to encounter CKT30 as the hardware hierarchy is explored. Reconfiguration operations are performed by a portion of the switch module software called Maintenance Request Administration, or MRA. The MRA includes a system process that runs as long as the switch module operating system software itself is up and running along with the terminal processes, e.g., P0 through P3, which are created dynamically as reconfiguration requests are processed.

In the preferred embodiment, the MRA system process simply waits for a request for hardware maintenance. Maintenance requests can originate in a variety of ways. For example, a request for maintenance can come from a process that is executing within the switch module itself, and be communicated to MRA via messaging. Telecommunications switching systems have a very flexible messaging scheme or protocol, as is well known in the art, that allows a great deal of information to be communicated among system components. In the subsequent discussion, the MRA is also referred to as the "system."

A request for maintenance can also come from the Master Control Center (MCC) of the administration module (AM). The MCC is the primary control terminal for the entire switch, although it is generally connected through the AM. Routine Diagnostics (RDs) are also executed periodically, and can generate requests for maintenance.

No matter how the request is generated, the initial request to remove and then restore CKT00 is received by MRA in step 501. In the subsequent operation (502), the DEDICATED subtending list is requested for CKT00 using software primitives which extract the appropriate elements from the data base. This consists of CTK10 and CTK20 in this example. They are designated as DEDICATED elements because of their high degree of dependence upon the upper level circuit element to which they are connected. Reconfiguration of these DEDICATED elements cannot be entrusted to another process, generally because reconfiguration operations performed on one module affect operation of another, thus requiring that reconfiguration steps be performed in a predetermined order. The degree of dependence upon upper-level circuits can be determined by a primitive upon examination of the switch module data base of interconnected circuit information.

FIG. 2 provides an indication of the relationships among the interconnected hardware elements, as well as an indication of which process will handle reconfiguration of each subordinate hardware element, or circuit. As illustrated in FIG. 2, CTK10 subtends from CKT00, and the plain solid line 201 that connected CKT00 and CTK10 shows that CTK10 is too strongly dependent upon CKT00 for its reconfiguration to be entrusted to any process but the master process P0. CKT20 is also strongly dependent upon CTK10 and CKT00, so it must also be designated a DEDICATED element.

On the other hand, even though CTK11 is interconnected with CKT00 as a subtending circuit or hardware element, nevertheless, reconfiguration of CTK11 may be delegated to a subordinate process as indicated by the double stroke across the interconnecting line 202. Thus, CTK11 will not be designated as a DEDICATED element by the primitive called by the master process P0.

Primitives are low-level software routines that access the switch module data base and determine dependencies of target modules. These dependencies are easily determined, since the switch module data base includes both static data related to the physical characteristics of the subordinate hardware elements (parameters such as type, location, etc.), and dynamic data related to status of the subordinate modules (such as whether the module is out of service, and the reason for this condition).

In the next step 503, the master process, P0 in this example, is assigned a row to position in the matrix, the process is created in the "INITIALIZING" state, and the process begins execution by retrieving any necessary data from the system. The master process P0 then (step 504) calls the appropriate primitive to get the list of DELEGATED elements for CKT00 and its subtenders (CTK10 and CKT20). In the example, CTK11 and CTK21 are returned, as shown in FIG. 2.

Once again, the process performed by the primitive that makes the decision regarding the DEDICATED, DELEGATED, or ACQUIRED characterization of particular hardware elements need only access the switch module data base to make this determination. In the next operation (505), the master process P0 proceeds through the DELEGATED list, requesting another process from the system for each circuit in the list. P0 then waits for a response (step 506) indicating the requested slave process has been created and has completed its own initialization before going on to the next DELEGATED element. This technique reduces the possibility of loops, or deadlocks, in the dependency matrix.

In the subsequent process step 507, the MRA system process receives a request from P0 to create a process for CKT11. The initial steps are similar to those executed when creating P0, except that the ACQUIRED list will be obtained via the appropriate primitive rather than the DEDICATED list. In the example, process P1 is created to handle CTK11 plus CKT22 and CKT30.

In the next operation 508, that of beginning slave process initialization, P1 is assigned a row position in the matrix, slave process P1 is created in the "INITIALIZING" state, and the process begins execution by retrieving any necessary data. P1 then calls the appropriate primitive (step 509) to get the list of DELEGATED elements for CTK11 and its subtenders (CKT22 and CKT30). In the example, CKT23 is returned. Slave process P2 follows steps similar to those of P1 after being created, however, its DELEGATED list will be empty. With no further DELEGATED elements, P2 completes its initialization in the subsequent operation 510 by setting its process state to the "WORKING" value and sending an acknowledgement message, containing P2's row position and the results of the process initialization, to P1, P2, now ready to go to work, waits for a command from the master P0 process.

When P1 receives the acknowledgement from P2, P1 sets bits in its (P1's) dependency vector (step 511) by setting P2's bit, plus all bits set in P2's dependency vector. With this technique, the master process P0 will ultimately become aware of all processes created for the complete request. Following the same initialization procedure, P1 acknowledges INITIALIZATION complete to master process P0, and, now that it is ready to go to work, waits for a command from P0. P0 similarly updates its dependency vector based on P1's acknowledgement and continues through its DELEGATED list, requesting that the system create P3 to handle CKT21. Note that, when the system requests the ACQUIRED list for CKT21, CKT30 will be discovered as already busy with P1. The MRA must then set P3's bit in P1's dependency vector to record the resulting dependency between the two processes. When all four processes have completed initialization, the final process dependency matrix will be as shown in the matrix given in FIG. 4, and the master P0 process then sets its process state to the "working" value and resumes execution. The completed dependency matrix indicates that processes P2 and P3 have no other processes upon which they depend, but processes P0 and P1 must wait until completion of dependent processes before they can proceed.

In operation, the master process keeps two extra vectors locally to keep track of the slave processes that have been sent a command, and the slave processes that have acknowledged back after executing a command. These two vectors are compared against the master process's dependency vector from the global matrix to determine when all slaves have been sent a command, and when all slaves have acknowledged back. It should be noted that the master knows about all of the slaves from its vector, and not just the ones below it in the process tree. This feature has been mentioned previously in the discussion of matrix set up.

A primitive designed to be called by the master process receives the command the master wants to send along with a set of pointers. The set of pointers includes a pointer to the master's dependency vector, a pointer to the vector of slave processes that have already been sent the command, and a pointer to the vector of the slave processes that have acknowledged back. The primitive returns to the master the next slave that can receive the command, if one can receive the command at that time. The master process routinely calls the primitive until a process is found that is ready to receive the command, or all processes have completed execution of the command.

The primitive determines how to find the next slave, first by determining whether the command is a "bottom-up" command such as the REMOVE command or a "top-down" command such as the RESTORE command. For "bottom-up" commands, the primitive uses the master's dependency vector to search for the first slave process it finds that has not been executed, as indicated by the vector that contains all of the slaves that have been sent the command already. It then uses that slave's row in the global dependency matrix to find all slave processes that it is dependent upon, and the vector of slave processes that have acknowledged back to see if all of those slaves have already executed the command. If a slave process has not executed the command yet, and all processes that it is dependent upon have already executed the command, it is passed back to the master process calling the primitive as the next slave to receive the command.

For "top-down" commands, the primitive uses the master'dependency vector to search for the first slave process it finds that has not been executed, as indicated by the vector that contains all of the slaves that have been sent the command already. It then uses that slave's column in the global dependency matrix to find all slave processes that are dependent on it, and it uses the vector of slave processes that have acknowledged back to see if all of those slaves have already executed the command. If a slave process has not executed the command yet, and all processes that are dependent on it have already executed the command, it is passed back to the master process calling the primitive as the next slave to receive the command.

In the next operation 512, master process P0 begins the remove sequence by sending the appropriate commands to each process to remove the DELEGATED circuits, in "bottom-up" fashion. In step 513, P0 examines the dependency vectors of the remaining processes whose bits are set in P0's dependency vector and which have not yet been run, to determine if they are "REMOVE-ready." A process is "REMOVE-ready" if its row in the dependency matrix contains no set bit corresponding to a process which has not yet been run. In the example, both P2 and P3 are immediately REMOVE-ready, and are invoked concurrently by P0. It should be noted that later, when P1 runs, it will be able to handle CKT30 appropriately since P3, which P1 is dependent on, will already have removed CKT21.

As the invoked processes receive the message containing the command to be executed, each is awakened, and calls the primitive which corresponds to the command it received. In this case, each will call the appropriate primitives to do a remove. Each process returns its results to the master P0 process via a message so that the master may accumulate all results and determine the success or failure of the overall request.

In the subsequent process step 514, as P0 receives the acknowledgements, it marks the corresponding slave process as having run, and accumulates the result into a final overall return value. After P0 has received the acknowledgements from both P2 and P3, P1 will become REMOVE-ready and will be invoked in turn (step 515).

When the last slave process has been run, the master process, P0, then continues with the call of the circuit-type-specific remove primitive for CKT00 (step 516) and accumulates the results from that remove into the overall results. P0 then begins the restore for CKT00 in step 517.

In the next operation 518, the master process, P0, starts the restore sequence by first calling the circuit-type-specific restore primitives for CKT00. In the subsequent step 519, P0 then sends the appropriate commands to each process to restore the DELEGATED circuits, in "top-down" fashion.

P0 determines the restore sequence by evaluating the "RESTORE-readiness" of each slave process. A slave process is "RESTORE-ready" if its column in the dependency matrix contains no set bit corresponding to a process which has not yet been run. In the example, the slave processes become RESTORE-ready in the following order: P1 first, followed by P2 and P3 together.

As for a remove, the master P0 process produces an overall result of the restore by accumulating the combined slave results into the CKT00 circuit-type-specific overall result. As described previously, each individual process, P0 through P3, could be executing incompatible legacy reconfiguration software. As a result, the existing family relationships can be left intact within the scope of each individual process, which in turn allows for software reuse.

FIG. 3 illustrates the interrelationships among the processes created to perform the reconfiguration operations. It should be noted that all of the processes described, P0 through P3, are so-called terminal processes as distinguished from the MRA system process. Terminal processes simply perform the task or tasks for which they are designed, and then extinguish themselves. Master process P0 launches other slave terminal processes P1 and P3 to perform reconfiguration tasks, and slave process P1 launches slave process P2 to perform reconfiguration functions. These processes are interdependent to the extent that slave process P1 cannot extinguish itself until process P2 is complete, P1 cannot terminate until both P2 and P3 are complete, and P0 cannot terminate until P1 and P3 have ended. It is also perfectly correct to consider the master terminal process and any slave terminal processes as part of MRA in a larger sense, although, if no reconfiguration tasks are currently active, the only part of MRA that is running is the system part that waits for reconfiguration requests.

There have been described herein a method and apparatus for efficiently accomplishing hardware maintenance and reconfiguration that are relatively free from the shortcomings of the prior art. It will be apparent to those skilled in the art that modifications may be made without departing from the spirit and scope of the invention. Accordingly, it is not intended that the invention be limited except as may be necessary in view of the appended claims.

In the claims hereof, any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein.

What is claimed is:

1. For a system including a centralized processor resource and a plurality of interconnected hardware elements, a method for performing hardware reconfiguration, the method comprising the steps of:
   (a) receiving a request for reconfiguration of one or more predetermined hardware elements, and, in response thereto;
   (b) initiating a master terminal process to determine family relationships among said predetermined hardware elements and other hardware elements to which the predetermined hardware elements are connected;
   (c1) determining, based upon family relationships, those hardware elements that must be reconfigured by the master terminal process to form a first set of hardware elements; and
   (c2) initiating a slave terminal process for one or more hardware elements to be reconfigured that are not elements of the first set of hardware elements.

2. The method in accordance with claim 1, wherein the step (a) of receiving a request comprises receiving a request for hardware reconfiguration at a system process of the centralized processor resource via a predetermined messaging protocol.

3. The method in accordance with claim 1, wherein the step (b) of initiating a master terminal process to determine family relationships further comprises the steps of:
   (b1) invoking a master terminal process and supplying at least one parameter identifying hardware elements to be reconfigured; and
   (b2) at the master terminal process, calling a software primitive to access an associated data base, acquire stored information relating to the hardware elements to be reconfigured, and determine family relationships among the hardware elements to be reconfigured and other hardware elements to which the hardware elements to be reconfigured are connected.

4. The method in accordance with claim 3, wherein the associated data base includes both static and dynamic information.

5. The method in accordance with claim 4, wherein static information includes data related to physical characteristics of the hardware elements.

6. The method in accordance with claim 5, wherein physical characteristics include type of hardware element and points of physical connection to other hardware elements.

7. The method in accordance with claim 4, wherein dynamic information includes data related to status of hardware elements.

8. The method in accordance with claim 7, wherein status of hardware elements includes operational status, and, if the hardware element is not operational, hardware status includes information relating to hardware defects.

9. The method in accordance with claim 3, wherein the step of determining family relationships comprises determining a degree of dependence of subtending hardware elements on modules to which they subtend.

10. The method in accordance with claim 9, wherein the degree of dependence is defined by assigning a relationship to each hardware element selected from the set of relationships consisting of:
    a dedicated relationship;
    a delegated relationship; and an acquired relationship.

11. The method in accordance with claim 10, wherein the dedicated relationship comprises a relationship that includes hardware elements subtending to an element originally requested for reconfiguration that must be reconfigured by the master terminal process.

12. The method in accordance with claim 10, wherein the delegated relationship comprises a relationship that includes hardware elements subtending to an element originally requested for reconfiguration that is reconfigured by a slave terminal process different from the process used to reconfigure the immediate parent element.

13. The method in accordance with claim 12, wherein the slave terminal process in initiated by the master terminal process.

14. The method in accordance with claim 13, wherein the slave terminal process is initiated by another slave terminal process.

15. The method in accordance with claim 10, wherein the acquired relationship comprises a relationship that includes hardware elements that are not dedicated or delegated, and for which a slave process is designed to assume responsibility.

16. For a system including a centralized processor resource and a plurality of interconnected hardware elements, apparatus for performing hardware reconfiguration comprising:
   means for receiving a request for reconfiguration of one or more predetermined hardware elements;
   means for initiating, in response to said request, a master terminal process to determine family relationships among said predetermined hardware elements and other hardware elements to which the predetermined hardware elements are connected;
   means for determining, based upon family relationships, those hardware elements that must be reconfigured by the master terminal process to form a first set of hardware elements; and
   means for initiating a slave terminal process for one or more hardware elements to be reconfigured that are not elements of the first set of hardware elements.

17. The apparatus of claim 16, wherein the means for receiving a request for reconfiguration comprises a software process running on the centralized processor resource.

18. The apparatus of claim 16, wherein the means for initiating the master terminal process to determine family relationships comprises:
   computer executable program code means for accessing an associated data base, acquiring stored information relating to the hardware elements to be reconfigured, and determining family relationships among the hardware elements to be reconfigured and other hardware elements to which the hardware elements to be reconfigured are connected.

19. In a telecommunications switch module that includes a centralized processor resource and a plurality of interconnected hardware elements, a method for performing hardware reconfiguration, the method comprising the steps of:
   (a) receiving a request for reconfiguration of one or more predetermined hardware elements at a system process of the centralized processor resource via a predetermined messaging protocol, and, in response thereto;
   (b) invoking a master terminal process and supplying at least one parameter identifying hardware elements to be reconfigured;
   (c) at the master terminal process, calling a primitive process to access an associated data base, acquire stored information relating to the hardware elements to be reconfigured, and determine family relationships among the hardware elements to be reconfigured and other hardware elements to which the hardware elements to be reconfigured are connected;
   (d) determining, based upon the family relationships, those hardware elements that must be reconfigured by the master terminal process to form a first set of hardware elements; and
   (e) initiating a slave terminal process for one or more hardware elements to be reconfigured that are not elements of the first set of hardware elements.

* * * * *